(12) United States Patent
Bhattacharya

(10) Patent No.: US 7,573,840 B2
(45) Date of Patent: Aug. 11, 2009

(54) AAL2 PROFILES FOR UMTS IUUP

(75) Inventor: Jisu Bhattacharya, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 572 days.

(21) Appl. No.: 11/119,464

(22) Filed: Apr. 30, 2005

(65) Prior Publication Data

US 2006/0245437 A1    Nov. 2, 2006

(51) Int. Cl.
*H04B 7/00*    (2006.01)

(52) U.S. Cl. ............... 370/310.1; 370/395.1; 370/395.6
(58) Field of Classification Search .............. 370/310.1, 370/395.1, 395.6, 395.64
See application file for complete search history.

(56) References Cited

U.S. PATENT DOCUMENTS

| | | | |
|---|---|---|---|
| 6,711,126 B1 * | 3/2004 | Besset-Bathias | 370/229 |
| 6,795,437 B1 * | 9/2004 | Rasanen et al. | 370/395.1 |
| 7,283,533 B1 * | 10/2007 | Kumar et al. | 370/395.52 |
| 2003/0227908 A1 * | 12/2003 | Scoggins et al. | 370/352 |
| 2005/0105511 A1 * | 5/2005 | Poikselka | 370/352 |
| 2005/0201336 A1 * | 9/2005 | Lee | 370/335 |
| 2006/0133352 A1 * | 6/2006 | Chang | 370/352 |

OTHER PUBLICATIONS

AF-VTOA-0113.000—ATM Trunking Using AAL2 for Narrowband Services, The ATM Forum Technical Committee, Cover p. 52, Feb. 1999.
AF-VTOA-0120.000—Implementation Conformance Statement (ICS) Proforma for ATM Trunking Using AAL2 for Narrowband Services (Addendum), The ATM Forum Technical Committee, Cover p. 52, May 1999.
Universal Mobile Telecommunication System (UMTS); UTRAN Iu Interface Data Transport and Transport Signalling (3G TS 25.414 version 3.2.0 Release 1999); ETSI TS 125 414 V3.2.0 (Jan. 2000), pp. 1-10.
Universal Mobile Telecommunication System (UMTS); UTRAN Iu Interface User Plane Protocols (3G TS 25.415 version 3.1.0 Release 1999); ETSI TA 125 415 V3.1.0 (Jan. 2000), pp. 1-51.
Universal Mobile Telecommunication System (UMTS); Mandatory Speech Codec speech processing functions; AMR Speech Codec Frame Structure (3G TS 26.101 version 3.0.0 Release 1999), ETSI TS 126 101 v3.0.0 (Jan. 2000), pp. 1-18.
3GPP TS 26.102—Mandatory Speech Codec; AMR Speech codec; Interface to Iu and Uu (Release 1999), TS 26.102 v3.0.0 (Dec. 1999), Technical Specification, Cover p. 12, Dec. 1999.

(Continued)

*Primary Examiner*—Chirag G Shah
*Assistant Examiner*—Minh-Trang Nguyen

(57) ABSTRACT

A profile for bearer data as found in IuUP and NbUP so that it can be signaled over SDP. The present invention provides AAL2 profiles that can be used to describe AAL2 bearer connections in a radio access network between a radio network controller (RNC) and a media gateway, or between two media gateways in a core network. In an embodiment, the call agent is a wireless call agent, such as a mobile switching center (MSC). The profiles provided by the present invention are used by the call agent to set up AAL2 bearer connections on the media gateway.

1 Claim, 1 Drawing Sheet

OTHER PUBLICATIONS

3GPP TS 26—Mandatory Speech Code; AMR Speech Code: Interface to Iu, Uu and Nb; TS 26.102 v4.0.0 (2001-03), Technical Specification, Cover p. 14, Mar. 2001.*

3GPP TR 23.910—Circuit Switched Data Bearer Services (Release 1999), 3G TR 23.910 v1.0.0 (Dec. 1999), Technical Report, Cover p. 14, Dec. 1999.

"Series 1: Integrated Services Digital Network, Overall network aspects and functions—Protocol layer requirements, B-IDSN ATM layer specification", ITU-T Recommendation I.361, International Telecommunication Union, Cover p. 52, Feb. 1999.

"Series 1: Integrated Services Digital Network, Overall network aspects and functions—Protocol layer requirements, B-IDSN ATM Adaptation Layer specification: Type 2 AAL", ITU-T Recommendation I.363.2, International Telecommunication Union, Cover p. 52, Nov. 2000.

"Series 1: Integrated Services Digital Network, Overall network aspects and functions—Protocol layer requirements, Segmentation and Reassembly Service Specific Convergence Sublayer for the AAL type 2", ITU-T Recommendation I.366.1, International Telecommunication Union, Cover p. 30, Jun. 1998.

"Series 1: Integrated Services Digital Network, Overall network aspects and functions—Protocol layer requirements, AAL type 2 service specific convergence sublayer for narrow-band services", ITU-T Recommendation I.366.2, International Telecommunication Union, Cover p. 107, Nov. 2000.

"Series 1: Integrated Services Digital Network, Overall network aspects and functions—Protocol layer requirements, AAL type 2 service specific convergence sublayer for narrow-band services, Corrigendum 1", ITU-T Recommendation I.366.2 Corrigendum 1, International Telecommunication Union, Cover p. 1, Mar. 2002.

Kumar, R. et al., "Conventions for the use of the Session Description Protocol (SDP) for ATM Bearer Connections", RFC 3108, Network Working Group, pp. 1-106, May 2001.

Handley, M. et al., "SDP: Session Description Protocol", RFC 2327, Network Working Group, pp. 1-44, Apr. 1998.

Thompson, B. et al., PPP Over Asynchronous Transfer Mode Adaptation Layer 2 (AAL2), RFC 3336, pp. 1-12, Dec. 2002.

* cited by examiner

AAL2 PROFILES FOR UMTS IUUP

BACKGROUND

Universal Mobile Telecommunications Service (UMTS) is a third-generation broadband, packet-based transmission of text, digitized voice, video, and multimedia at data rates up to 2 megabits per second (Mbps) that offers a consistent set of services to mobile computer and phone users no matter where they are located in the world.

Circuit-switched is a type of telecommunications network in which a physical path is obtained for and dedicated to a single connection between two end-points in the network for the duration of the connection. Asynchronous transfer mode (ATM) is a dedicated-connection switching technology that organizes digital data into 53-byte cell units and transmits them over a physical medium using digital signal technology. The transport network user plane in a radio access network (RAN) is called IuUP and the transport network user plane in a core network (CN) is called NbUP. IuUP and NbUP can be ATM-based using ATM Adaptation Layer (AAL) type 2 adaptation, as per 3GPP TS 25.414. The Service Specific Segmentation and Reassembly (SSSAR) sublayer of ITU-T Recommendation I.366.1 is used for the segmentation and reassembly of AAL2 session data units (SDUs). It is to be noted that only SSSAR is used from ITU-T Recommendation I.366.1

Certain conventions exist for using the Session Description Protocol (SDP) to control ATM bearer connections, and any associated AAL. For AAL2 bearer connections, SDP parameters include a profile number that describes the nature of the bearer connection. The profiles described in ITU-T I.366.2 Annex P or AF-VTOA-0113 are not suitable for this transport because they are restricted to using user to user information (UUI) codepoints 0-15, whereas IuUP (3GPP TS 25.414) uses codepoints 26 and 27 for frame-mode data. ITU-T I.366.2 specifies that frame mode data shall use UUI codepoints 26 and 27 to delineate a sequence of packets whose reassembly is the data unit.

SUMMARY

The present invention defines a profile for bearer data as found in IuUP and NbUP so that it can be signaled over SDP. The present invention provides AAL2 profiles that can be used to describe AAL2 bearer connections in a radio access network between a radio network controller (RNC) and a media gateway, or between two media gateways in a core network. In an embodiment, the call agent is a wireless call agent, such as a mobile switching center (MSC). The profiles provided by the present invention are used by the call agent to set up AAL2 bearer connections on the media gateway. In embodiments where the transport network utilizes a IuUP layer, the AAL2 bearer connections on the media gateway are set up on the RAN. In embodiments where the transport network utilizes an NbUP layer, the AAL2 bearer connections on the media gateway are set up on the core network. Additionally, the AAL2 profiles of the present invention can be used to extend the use of profiles for AAL2 frame mode.

DETAILED DESCRIPTION

Incorporation by Reference

Figure 1:
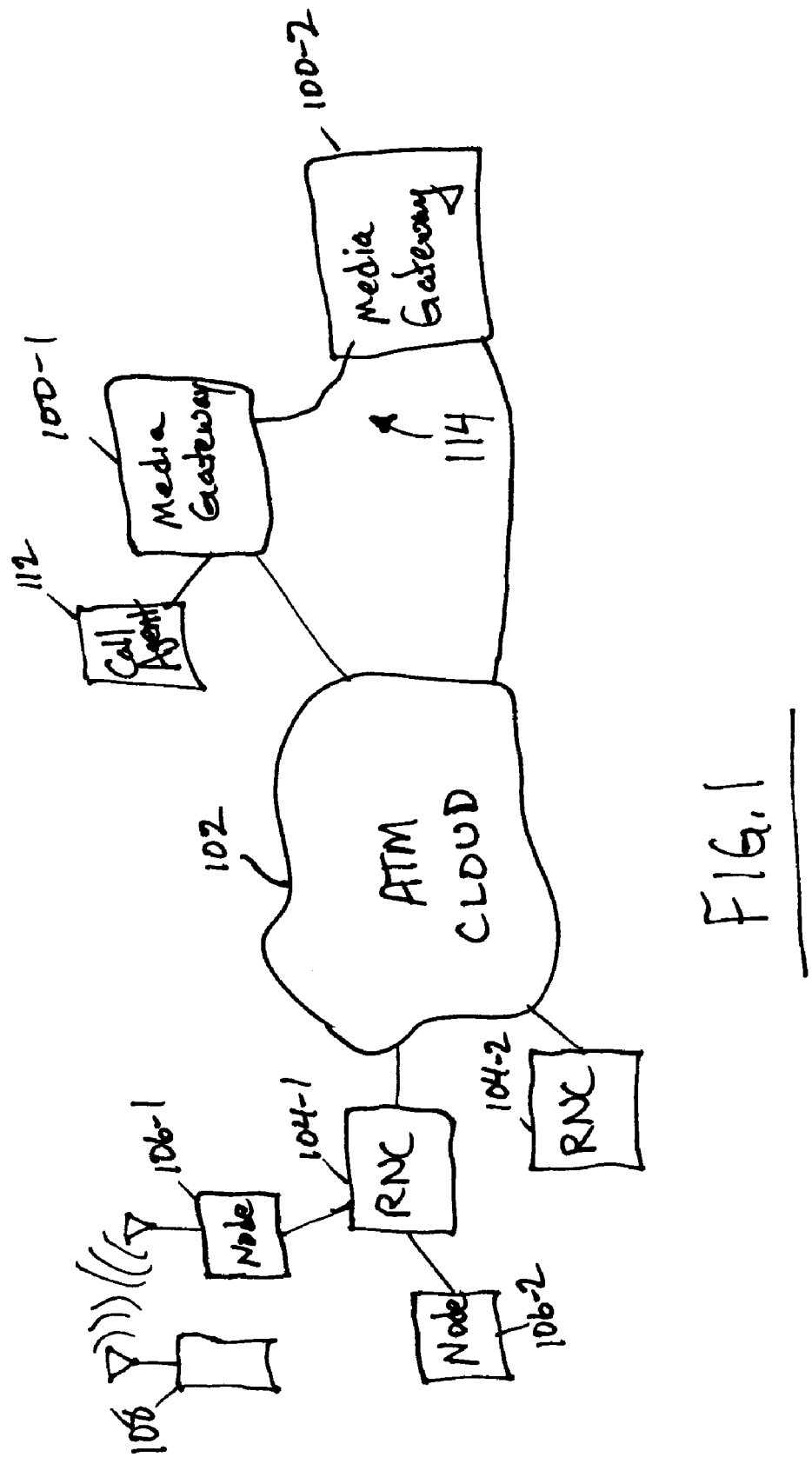
FIG. 1 illustrates the environment in which embodiments of the present invention can be used.

The following items are incorporated by reference in their entireties, and are published by the International Telecommunications Union, whose website appears at www.itu.int:
1. ITU-T I.361—B-ISDN ATM Layer Specification
2. ITU-T I.363.2—B-ISDN ATM Adaptation Layer Specification: Type 2 AAL
3. ITU-T I.366.1—Segmentation and Reassembly Service Specific Convergence Sublayer for the AAL Type 2
4. ITU-T I.366.2—AAL Type 2 Service Specific Convergence Sublayer for Narrow Band Services 11/2000

The following items are incorporated by reference in their entireties, and are published by 3rd Generation Mobile System, A Global Initiative, whose website appears at www.3gpp.org:
1. AF-VTOA-0113.000—ATM Trunking Using AAL2 for Narrowband Services
2. 3GPP TS 25.414—UTRAN Iu Interface Data Transport and Transport Signaling (release 1999)
3. 3GPP TS 25.415—UTRAN Iu Interface User Plane Protocols (Release 1999)
4. 3GPP TS 26.101—AMR Speech Codec; Frame Structure (Release 1999)
5. 3GPP TS 26.102—Mandatory Speech Codec; AMR Speech Codec; Interface to Iu, Uu and Nb (Release 1999)
6. 3GPP TS 23.910—Circuit Switched Data Bearer Services (Release 1999)

FIG. 1 illustrates the environment in which embodiments of the present invention can be used. Media gateway 100 communicates across ATM cloud 102 to RNCs 104-1 and 104-2 using AAL2. While two RNCs are illustrated as an example, it is to be understood that other RNCs may also be used depending on the network configuration in which the present invention is applied. As illustrated, RNC 104-1 is connected to multiple nodes 106-1 and 106-2, which communicate with other devices such as wireless communication device 108, for example. Wireless communication can be a cellular telephone, or other wireless device capable of communicating over ATM cloud 102. As illustrated in FIG. 1, ATM cloud 102 utilizes IuUP.

In an embodiment, the call agent used by media gateway 100 is wireless call agent 112, such as an MSC. The profiles provided by the present invention are used by the call agent to set up AAL2 bearer connections on the media gateway. In embodiments where the transport network utilizes a IuUP layer, such as in ATM cloud 102, the AAL2 bearer connections on media gateway 100 are set up on ATM cloud 102. In embodiments where the transport network utilizes an NbUP layer, the AAL2 bearer connections on media gateway 100 are set up on core network 114.

Table 1 describes a profile used in accordance with the present invention to transmit AMR frames over IuUP support mode. The UUI codepoint of 27 is used for intermediate SSSAR frames, in applications where the maximum SDU length is big enough to accommodate the complete IuUP payload. The packet length does not include the size of IuUP Frame Control Part and Frame Checksum part. This overhead is equal to four octets for PDU type 0 format, and three octets for PDU type 1 format. The packet length is to be rounded up to the next octet to include padding bits. The mapping of bits to IuUP Frame Control Part is performed in accordance with 3GPP TS 26.102. The FQC field inside the IuUP Frame Control Part indicates whether the frame is errored. The sequence number is the frame number inside the IuUP Control Part. In embodiments other than those accommodating AMR SID, M is equal to three because there is one SDU for each of class A, B and C bits.

TABLE 1

| UUI Codepoint Range | Packet Length (Bits) | Encoding Format References | Description of Algorithm | M | Packet Time (ms) | Seq. No. Interval (ms) |
|---|---|---|---|---|---|---|
| 26, 27 | 244 | 3GPP TS 26.101 | AMR 12.2 | 3 | 20 | 20 |
| 26, 27 | 204 | 3GPP TS 26.101 | AMR 10.2 | 3 | 20 | 20 |
| 26, 27 | 159 | 3GPP TS 26.101 | AMR 7.95 | 3 | 20 | 20 |
| 26, 27 | 148 | 3GPP TS 26.101 | AMR 7.4 | 3 | 20 | 20 |
| 26, 27 | 134 | 3GPP TS 26.101 | AMR 6.7 | 3 | 20 | 20 |
| 26, 27 | 118 | 3GPP TS 26.101 | AMR 5.9 | 3 | 20 | 20 |
| 26, 27 | 103 | 3GPP TS 26.101 | AMR 5.15 | 3 | 20 | 20 |
| 26, 27 | 95 | 3GPP TS 26.101 | AMR 4.75 | 3 | 20 | 20 |
| 26, 27 | 39 | 3GPP TS 26.101 | AMR SID (initial) | 1 |  | 20 |
| 26, 27 | 39 | 3GPP TS 26.101 | AMR SID (update) | 1 | 160 | 160 |

In another embodiment, Table 2 describes a profile used in accordance with the present invention to transmit circuit-switched 64 kbps data frames over IuUP transparent mode. In an embodiment, the UUI codepoint of 27 is used for intermediate SSSAR frames. The SDU size is defined in accordance with the definition found in 3GPP TS 23.910. There is no IuUP overhead in this embodiment. In an embodiment, the UUI serves as a sequence number by the repetition of 27 and 26 if CPS packet payload size is configured to be 40 packets.

TABLE 2

| UUI Codepoint Range | Packet Length (Octets) | Encoding Format Reference | Description of Algorithm | M | Packet Time (ms) | Seq. No. Interval (ms) |
|---|---|---|---|---|---|---|
| 26, 27 | 80 | 3GPP TS 23.910 | 64 kbps/s transparent data | 1 | 10 | 5 |

In either case of Table 1 or Table 2, the packets can contain data describing voice, text, image or video. The AAL2 profiles described above in Table 1 and Table 2 can be stored on media access gateway 100, or, in an alternative embodiment, within call agent 112.

While AAL2 profiles for use in UTMS IuUP and NbUP have been illustrated and described in detail, it is to be understood that many modifications can be made to the various embodiments of the present invention, without departing from the spirit thereof.

What is claimed is:

1. A mobile switch center, comprising:
   an establishment circuit to establish a profile, where the profile includes a User to User Indication (UUI) range including codepoints 26 and 27, a packet length, an encoding format reference, a number of Service Data Units (SDU) in a packet, a packet time, and a sequence number interval; and
   a connection setup circuit to perform connection setup of an Asynchronous Transfer Mode (ATM) Adaptation Layer (AAL) type 2 bearer connection in an ATM network utilizing Session Description Protocol (SDP) over one of Iu User Plane (IuUP) layer and Nb User Plane (NbUP) layer,
   where the connection setup circuit uses the profile to set variables of a protocol stack in the connection.

* * * * *